United States Patent [19]

Simmons

[11] Patent Number: 5,334,697
[45] Date of Patent: Aug. 2, 1994

[54] POLYIMIDE GAS SEPARATION MEMBRANES

[75] Inventor: John W. Simmons, Wilmington, Del.

[73] Assignee: L'Air Liquide, S.A., Paris, France

[21] Appl. No.: 130,771

[22] Filed: Oct. 4, 1993

[51] Int. Cl.$^5$ ............... C08G 73/10; B01D 53/22; B01D 71/64
[52] U.S. Cl. ..................... 528/353; 528/172; 528/173; 528/176; 528/183; 528/185; 528/188; 528/220; 528/229; 528/350; 210/500.1; 210/500.21; 96/14; 95/54
[58] Field of Search ............... 528/353, 176, 183, 185, 528/188, 172, 173, 220, 229, 350; 55/161, 68, 158; 210/500.1, 500.21

[56] References Cited

U.S. PATENT DOCUMENTS

| | | | |
|---|---|---|---|
| 5,045,093 | 9/1991 | Meier et al. | 55/16 |
| 5,051,520 | 9/1991 | Trofimenko | 528/183 |
| 5,067,970 | 11/1991 | Wang et al. | 55/16 |
| 5,097,000 | 3/1992 | Trofimenko | 528/183 |
| 5,101,004 | 3/1992 | Trofimenko | 528/183 |
| 5,112,941 | 5/1992 | Kasai et al. | 528/353 |
| 5,160,353 | 11/1992 | Gochanour | 55/158 |
| 5,178,650 | 1/1993 | Hayes | 55/16 |
| 5,234,471 | 8/1993 | Weinberg | 95/47 |

*Primary Examiner*—John Kight, III
*Assistant Examiner*—Patricia Hampton-Hightower
*Attorney, Agent, or Firm*—Cary A. Levitt

[57] ABSTRACT

A polyimide gas separation membrane containing repeating units derived from 9,9-disubstituted xanthene dianhydride is disclosed.

6 Claims, No Drawings

POLYIMIDE GAS SEPARATION MEMBRANES

BACKGROUND

1. Field of the Invention

The present invention relates to gas separation membranes made from a polyimide incorporating repeating units, derived from 9,9 disubstituted xanthene dianhydrides and aromatic diamines.

2. Prior Art

U.S. Pat. Nos. 5,101,004; 5,051,520 and 5,097,000 disclose certain 9,9-disubstituted xanthene dianhydrides and methods for preparation. These patents also disclose that the dianhydrides are useful for making polyimides which have advantageous properties. The patents do not, however, disclose a polyimide gas separation membrane based on such dianhydrides.

SUMMARY OF THE INVENTION

The present invention relates to novel polyimide gas separation membranes, and the separation of at least one gas from a mixture of gases using such membranes. The polyimides are polymers or copolymers derived from 9,9-disubstituted xanthene dianhydrides and aromatic diamines. Preferably, at least about 10 mole percent and most preferably at least about 50 mole percent of the dianhydride residues are derived from 9,9-disubstituted xanthene dianhydride, which has the following structural formula:

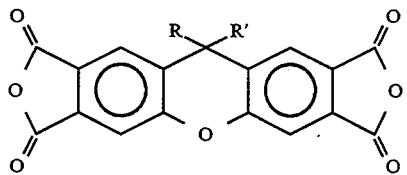

where R and R'=—H, —$CH_3$, —$CF_3$, -phenyl, substituted phenyl, alkyl or perfluoroalkyl of 1 to 16 carbon atoms, preferably 1 to 8 carbon atoms. R and R' can be different or alike.

These polyimides exhibit superior permselectivity with respect to several gaseous mixtures and particularly with respect to mixtures of nitrogen and oxygen, such as found in the atmosphere.

DETAILED DESCRIPTION OF THE INVENTION

The separation of one or more gases from a complex multicomponent mixture of gases has been found to be necessary in a large number of industries. Such separations currently are undertaken commercially by such processes as cryogenics, pressure swing adsorption and membrane separations. In certain of the separations, membrane separations have been found to be economically more viable than other processes. In a gas separation process, one side of the membrane is contacted with a multicomponent gas mixture and certain of the gases of said mixture permeate through the membrane faster than the other gases. Gas separation membranes are semipermeable. They allow for some gases to permeate through them while serving as a barrier to other gases in a relative sense.

The present invention relates to the discovery that gas separation membranes made from polyimides which compositionally incorporate 9,9-disubstituted xanthene dianhydrides possess an excellent balance of gas permeation rates and selectivities of one gas over the other gases in a multicomponent gas mixture. The high productivity of these membranes is believed to be due to the optimization of the molecular free volume in the polymer structure resulting from the incorporation of the dianhydride residues in the polyimide chain.

Generally, an inverse relationship between the gas permeation rate (flux) and the selectivity of said gas over other gases in a multicomponent gas mixture has been exhibited within polymer classes, such as polyimides. Because of this, prior art polyimide gas separation membranes tend to exhibit either high gas permeating rates at the sacrifice of high gas selectivities or high gas selectivities at the sacrifice of high gas permeation rates. It is highly desirable for polyimide gas separation materials to exhibit high gas selectivities while maintaining high gas permeation rates. For example, in the separation of oxygen from nitrogen or air, oxygen generally permeates the membrane more readily. Therefore, it is desirable to increase the membrane's selectivity toward oxygen while maintaining high gas permeation rates.

The present invention provides high productivity polyimide gas separation materials with good selectivity and high gas permeation rates. The polyimide materials of the present invention incorporate at least one and preferably at least 10% (molar), more preferably 25% (molar) most preferably 50% (molar), 9,9-disubstituted xanthene dianhydrides residues in the polyimide backbone chain. The balance of the dianhydride component of said polyimide materials may constitute either aromatic or aliphatic dianhydrides. Suitable aromatic dianhydrides may be, for example, 3,3',4,4'-benzophenonetetracarboxylic acid dianhydride, 1,2,4,5-benzenetetracarboxylic acid dianhydride, 3,3',4,4'-biphenyltetracarboxylic acid dianhydride, 5,5'-[2,2,2-trifluoro-1-(trifluoromethyl) ethylidene]-bis-1,3-isobenzofurandione, pyromellitic dianhydride; 2,3,6,7-naphthalene tetracarboxylic dianhydride; 3,3',4,4'-biphenyl tetracarboxylic dianhydride; 1,2,5,6-napthalene tetracarboxylic dianhydride; 2,2',3,3'-biphenyl tetracarboxylic dianhydride; 3,3',4,4'-benzophenone tetracarboxylic dianhydride; 2,2-bis(3,4-dicarobxyphenyl) propane dianhydride; bis(3,4-dicarboxyphenyl) sulfone dianhydride; 3,4,9,10-perylene tetracarboxylic dianhydride; bis(3,4-dicarboxyphenyl) propane dianhydride; 1,1-bis-(2,3-dicarboxyphenyl) ethane dianhydride; 1,1-bis-(3,4-dicarboxyphenyl) ethane dianhydirde; bis-(2,3-dicarboxyphenyl) methane dianhydirde; bis-(3,4-dicarboxyphenyl) methane dianhydride; oxdiphthalic dianhydride; bis(3,4-dicarboxyphenyl) sulfone dianhydride; and the like or mixtures thereof. Suitable aliphatic dianhydrides may include, for example, 1,2,3,4-cyclopentanetetracarboxylic acid dianhydride. These examples should not be considered limiting. Virtually any dianhydride may be used in conjunction with 9,9-disubstituted xanthene dianhydrides.

There are no limitations on the diamine component. Without limitation, suitable diamines for use in making the polyimide compositions include: meta-phenylenediamine paraphenylene diamine; 4,4'-diamino-diphenyl propane; 4,4'-diamino-diphenyl metbane; benzidine; 4,4'-diamino-diphenyl sulfide; 4,4'-diamino-diphenyl sulfone; 3,3'-diamino-diphenyl sulfone; 4,4'-diamino-diphenyl ether; 2,6-diamino-pyridine; bis-(4-amino-phenyl)diethyl silane; bis-(4-amino-phenyl)phosphine oxide; bis-(4-amino-phenyl)-N- methylamine; 1,5-diamino-naphthalene; 3,3'-dimethyl-4,4'-diamino-biphenyl; 3,3'-dimethoxy benzidine; 2,4-bis(beta-amino-t-butyl)toluene; bis-(para-beta-amino-t-butyl-phenyl)ether; para-bis(2-methyl-4-amino-pentyl)-benzene; para-bis-(1,1-dimethyl-5-amino-pentyl)benzene; m-xylylene diamine; p-xylylene diamine; bis(para-amino-cyclohexy)methane; hexamethylene diamine; heptamethylene diamine; octamethylene diamine; nonamethylene diamine; decamethylene diamine; 3-methylheptamethylene diamine; 4,4-dimethylheptamethylene diamine; 2,11-diamino-dodecane; 1,2-bis-(3-aminopropoxy)ethane; 2,2-dimethyl propylene diamine; 3-methoxy-hexamethylene diamine; 2,5-dimethylhexamethylene diamine; 2,5-dimethylheptamethylene diamine; 5-methylnonamethylene diamine; 1,4-diaminocyclohexane; 1,12-diamino-octadecane; $H_2N(CH_2)_3O(CH_2)_3NH_2$; $H_2N(CH_2)_3S(CH_2)_3NH_3$; $H_2N(CH_2)_3N(CH_3(CH_2)_3NH_2$; and mixtures thereof.

As one skilled in the art may appreciate, one polyimide gas separation material of the present invention can be tailored over a wide range of gas separations through the choice of dianhydride and diamine components.

The preferred polyimides of the present invention incorporate at least one of the following structural formula:

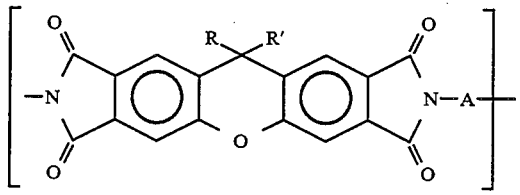

wherein R and R' are defined above; A is a divalent radical containing at least two carbon atoms with the two amino groups of said diamine each being attached to separate carbon atoms of said divalent radical.

For example, A may be

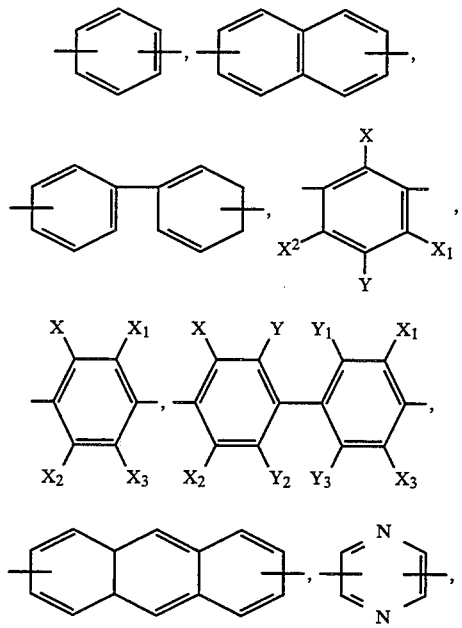

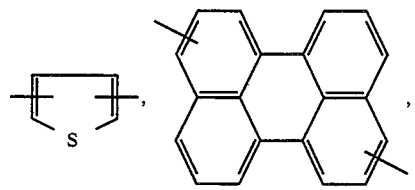

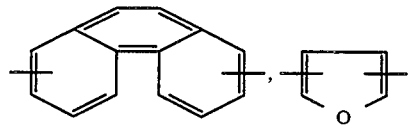

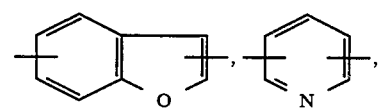

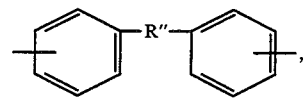

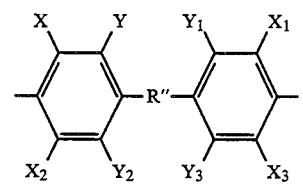

or mixtures thereof where R" is

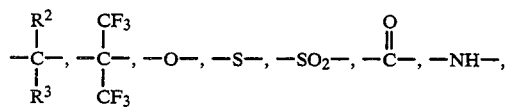

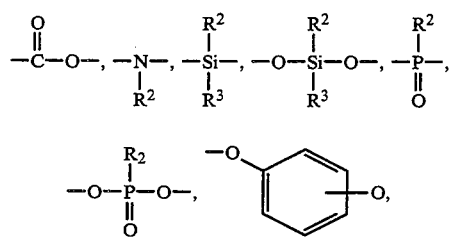

or mixtures thereof; where $R^2$ and $R^3$ are independently alkyl or aryl groups; —X, —$X_1$, —$X_2$ and —$X_3$ independently are alkyl groups containing 1 to 6 carbon atoms; and —Y, —$Y_1$—$Y_2$ and —$Y_3$ independently are —X or —H.

The polymer preferably has an inherent viscosity of at least 0.1 as measured at 30° C. on an 0.5% by weight solution in N-methylpyrrolidinone.

As preferred examples, some of the polyimides useful in this invention are soluble in ordinary organic solvents. This is a great advantage for the ease of fabrication of industrially useful membranes.

Useful solvents include normally liquid N,N-dialkylcarboxylamides: Preferred solvents include the lower molecular weight members of such carboxylamides, particularly N,N-dimethyltormamide and N,N-dimethylacetamide. Other useful compounds of this class of solvents are N,N-diethylformamide and N,N-diethylacetamide. Other solvents which may be used are dimethylsulfoxide, N-methyl-2-pyrrolidone, tetramethyl urea, dimethylsulfone, hexamethylphosphoramide, tetramethylene sulfone, and the like. The solvents can be used alone, in combinations with one another or in combinations with poor solvents such as benzene, benzonitrile, dioxane, etc.

Methods of making the 9,9-disubstituted xanthene dianhydrides are known in the art and are described in U.S. Pat. Nos. 5,101,004; 5,051,520 and 5,097,000. Methods of making the polyimides are also well known in the art and some are described in the same patents. Methods of preparing gas separation membranes are known in the art. For example, the soluble polyimides can be solution cast on porous solvent resistant substrates to serve as the dense separating layer of a composite membrane; or they can be solution cast as dense or asymmetric membranes. The polymer may also be blended with a wide variety of other polymers. Such blends may be used to form gas separation membranes by methods well known in the art.

The polyimides described in this invention generally have high inherent thermal stabilities. The high temperature characteristics of these polyimides can help to prevent the membrane compaction problems observed in other polymers at even moderate temperatures.

The inventive polyimides may be formed into membranes having a variety of configurations, including hollow-fiber membranes. The configuration of the membrane is not limiting. For hollow-fiber membranes, the gas mixture to be separated may be introduced to the bore side or the so-called shell side of the membrane. It is usually preferable to introduce the gas to be separated to the bore side of the hollow-fiber membrane.

The polyimide membranes disclosed herein have found use in gas separations. The invention as described herein is useful for the separation of, for example, oxygen from nitrogen or air; hydrogen from at least one of carbon monoxide, carbon dioxide, helium, nitrogen, oxygen, argon, hydrogen sulfide, nitrous oxide, ammonia, and hydrocarbon of 1 to about 5 carbon atoms, especially methane, ethane and ethylene; ammonia from mixtures of at least one of hydrogen, nitrogen, argon, and hydrocarbon of 1 to about 5 carbon atoms; e.g., methane; carbon dioxide from at least one of carbon monoxide and hydrocarbon of 1 to about 5 carbon atoms; e.g., methane; hydrogen sulfide from hydrocarbon of 1 to about 5 carbon atoms; for instance, methane, ethane, or ethylene; and carbon monoxide from at least one of hydrogen, helium, nitrogen, and hydrocarbon of 1 to about 5 carbon atoms. It is emphasized that the invention may also be useful for liquid separations and is not restricted to these particular separation applications of gases nor the specific membranes in the examples. The present invention finds use in the enrichment of oxygen and nitrogen from air for increased combustion or inerting streams, respectively; in recovery of hydrogen in refinery and ammonia plants, separation of carbon monoxide from hydrogen in syngas systems; and separation of carbon dioxide or hydrogen sulfide from hydrocarbons.

EXAMPLES

Example 1

The polyimides were formed using the following general procedure:

A flame-dried 250 ml 3-necked round-bottomed flask, equipped with a mechanical stirrer and a nitrogen inlet tube, was charged with the diamine specified in Table 1. N-methylpyrrolidinone (NMP) was added and the solution was stirred at room temperature until the diamine had dissolved. The dianhydride(s) specified in Table 1 was added and the polymerization solution was allowed to stir overnight under a nitrogen atmosphere.

Generally, equimolar amounts of diamine and dianhydride(s) are used to ensure the highest molecular weights. The amount of NMP can vary but a 15-18% solids solution appears to give the optimal molecular weights of the polyimides.

The polyamic acid solution may be chemically or thermally imidized, or isolated as polyamic acid and then thermally imidized. For our purposes, the polymer was normally chemically imidized, as follows:

Triethylamine and acetic anhydride in approximately equimolar amounts were added consecutively and the polymer solution was heated to 100° C. for 1-2 hours. The solution was cooled to room temperature and precipitated into water in a blender. The polymer was ground up in the blender and filtered. The polymer was washed with water (2×) and then methanol (2×) and allowed to air-dry overnight at room temperature. The polymer was further dried in a vacuum oven at 230° C. for 2 hours.

A film of the polyimide was cast from a 15% by weight NMP solution onto a glass plate at 120° C. with a 15-mil ($38 \times 10^5$ m) knife gap. The film was dried on the plate at 120° C. for 90 minutes and then removed from the plate. The film was air-dried overnight. The film was then further dried in a vacuum oven (2.67 kPa) at 230° C. for 18 hours.

The film was tested for oxygen permeability and mixed gas oxygen/nitrogen (21/79) mole ratio) permeabilities at 500 psig ($34.5 \times 10^{-5}$ Pa) at 25° C. The results are reported in Table 1. The permeabilities are reported in Barrers.

A Barrer is the number of cubic centimeters of gas passed by the membrane at standard temperature and pressure times the thickness of the membrane in centimeters times $10^{-10}$ divided by the permeating area of the membrane in square centimeters times the time in seconds times the partial pressure difference across the membrane in cm Hg; i.e., $$\text{Barrer} = 10^{-10} \times \frac{\text{cm}^3 \text{ (STP) cm}}{\text{cm}^2 \cdot \text{sec} \cdot \text{cm Hg}}$$

where cm³/sec is the volume per second of permeated gas at standard temperature and pressure; cm is the thickness of the film; cm² is the area of the film; and cm.Hg is the pressure (or driving force).

The selectivity of a membrane in separating a two-component fluid mixture is defined as the ratio of the rate of passage of the more readily passed component to the rate of passage of the less readily passed component. Selectivity may be obtained directly by contacting a membrane with a known mixture of gasses and analyzing the permeate. Alternatively, a first approximation of the selectivity is obtained by calculating the ratio of the rates of passage of the two components determined separately on the same membrane. Rates of passage may be expressed in Barrer (B) units. As an example of selectivity, $\alpha$ $O_2/N_2 = 10$ indicates that the subject membrane allows oxygen gas to pass through at a rate ten times that of nitrogen.

TABLE 1

| Example | Diamine (a) | Dianhydride 1 (c) | Dianhydride 2 (d) | Mole % (c)/ Mole % (d) | $P_{O2}$ (Barrer) | $P_{O2}/P_{N2}$ |
|---|---|---|---|---|---|---|
| 1 | A | Z | — | 100 | 14.27 | 4.52 |
| 2 | B | Z | — | 100 | 0.92 | 7.13 |
| 3 | C | Y | — | 100 | 6.21 | 5.69 |
| 4 | D | Y | — | 100 | 28.69 | 4.44 |
| 5 | D | X | — | 100 | 15.40 | 4.87 |
| 6 | E | X | S | 25/75 | 3.54 | 6.38 |
| 7 | F | W | — | 100 | 2.63 | 6.53 |
| 8 | G | V | — | 100 | 11.58 | 5.23 |

Legend
A = 1,4-Bis(4-aminophenoxy)-2-t-butylbenzene(2-t-Bu-APB-144)
B = 1,3-Bis(3-aminophenoxy)benzene (APB-133)
C = 1,3-Bis(4-aminophenoxy)benzene (APB-134)
D = 4,4'-Oxydianiline (ODA)
E = 4,4'-Bis(4-aminophenoxy)-3',-di-t-butylbiphenyl (APDBBP)
F = 1,2-Bis 4-aminophenoxy)benzene (APB-124)
G = 4,4'-Methylenedianiline (MDA)
Z = 9,9-Bis(trifluormethyl)-2,3,6,7-xanthene tetracarboxylic dianhydride (6FCDA)
Y = 9-Phenyl-9-trifluoromethyl-2,3,6,7-xanthene tetracarboxylic dianhydride (3FCDA)
X = 9,9-Diphenyl-2,3,6,7-xanthene tetracarboxylic dianhydride (PPXDA)
W = 9-Methyl-9-phenyl-2,3,6,7-xanthene tetracarboxylic dianhydride (MPXDA)
V = 9-Methyl-9-trifluoromethyl-2,3,6,7-xanthene tetracarboxylic dianhydride (MTXDA)
S = Diphenylsulfone tetracarboxylic dianhydride (DSDA)

I claim:

1. A gas separation membrane formed from a polyimide incorporating at least one dianhydride unit based on a 9,9-disubstituted xanthene dianhydride.

2. The gas separation membrane of claim 1 formed from a polyimide incorporating at least one dianhydride unit based on the following repeating units:

where R and R' independently are —H, —CH$_3$, —CF$_3$, -phenyl, substituted phenyl, alkyl or perfluoroalkyl groups of 1 to 16 carbon atoms.

3. The gas separation membrane of claim 1 in which the remainder of repeating units are derived from aromatic dianhydrides, aliphatic dianhydrides and aromatic diamines.

4. The gas separation membrane of claim 1 wherein the polyimide used to form the membrane comprises the following repeating units:

where R and R' are independently —H, —CH$_3$, —CF$_3$, -phenyl, substituted phenyl, alkyl or perfluoroalkyl groups of 1 to 16 carbon atoms; and A is a divalent radical containing at least two carbon atoms with the amino groups being attached to different carbon atoms.

5. The gas separation membrane of claim 4 wherein A is:

-continued

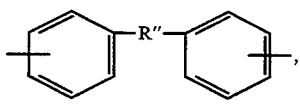

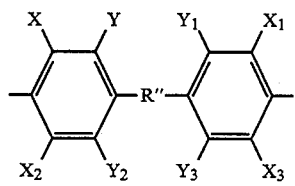

or mixtures thereof; where R″ is

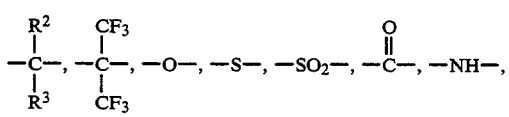

-continued

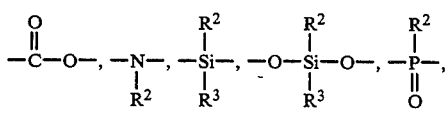

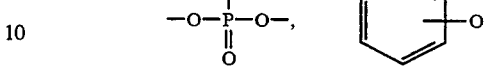

or mixtures thereof; $R^2$ and $R^3$ are independently alkyl or aryl groups; $-X$, $-X_1$, $-X_2$ and $-X_3$ independently are alkyl groups containing 1 to 6 carbon atoms, and $-Y$, $-Y_1$, $-Y_2$ and $-Y_3$ independently are $-X$ or $-H$.

6. The gas separation membrane of claim 1 in which the polymer has an inherent viscosity of at least 0.1 as measured at 30° C. on an 0.5 weight percent solution in concentrated sulfuric acid.

* * * * *